(12) United States Patent
Kim et al.

(10) Patent No.: US 11,495,409 B2
(45) Date of Patent: Nov. 8, 2022

(54) MULTI-LAYERED CERAMIC CAPACITOR

(71) Applicant: SAMSUNG ELECTRO-MECHANICS CO., LTD., Suwon-si (KR)

(72) Inventors: Hwi Dae Kim, Suwon-si (KR); Chan Yoon, Suwon-si (KR); Ji Hong Jo, Suwon-si (KR); Sang Soo Park, Suwon-si (KR); Woo Chul Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 20 days.

(21) Appl. No.: 16/782,616

(22) Filed: Feb. 5, 2020

(65) Prior Publication Data

US 2021/0020374 A1    Jan. 21, 2021

(30) Foreign Application Priority Data

Jul. 17, 2019    (KR) ........................ 10-2019-0086398

(51) Int. Cl.
*H01G 4/30*    (2006.01)
*H01G 2/02*    (2006.01)
(Continued)

(52) U.S. Cl.
CPC ................. *H01G 4/30* (2013.01); *H01G 2/02* (2013.01); *H01G 4/012* (2013.01); *H01G 4/1218* (2013.01)

(58) Field of Classification Search
CPC ........... H01G 4/30; H01G 4/012; H01G 2/02; H01G 4/1218; H01G 4/005; H01G 4/1209; H01G 4/008
(Continued)

(56) References Cited

U.S. PATENT DOCUMENTS 5,170,317 A * 12/1992 Yamada ................ H01G 4/255
29/25.42
8,351,181 B1    1/2013 Ahn et al.
(Continued)

FOREIGN PATENT DOCUMENTS

CN    102623176 A    8/2012
CN    102842424 A    12/2012
(Continued)

OTHER PUBLICATIONS

Office Action issued in corresponding Chinese Patent Application No. 202010254779.5 dated Jul. 28, 2022, with English translation.

*Primary Examiner* — Arun Ramaswamy
(74) *Attorney, Agent, or Firm* — Morgan, Lewis & Bockius LLP

(57) ABSTRACT

A multilayer ceramic capacitor includes a body including a dielectric layer and first and second internal electrodes having different sizes to each other, and having first and second surfaces of the first and second internal electrodes, opposing each other in a stacking direction, third and fourth surfaces connected to the first and second surfaces and opposing each other, and fifth and sixth surfaces connected to the first and second surfaces and connected to the third and fourth surfaces, and opposing each other; and first and second external electrodes. When a margin of the first internal electrode in a longitudinal direction is b, and a margin of the first internal electrode in a width direction is d, a margin of the second internal electrode in a longitudinal direction is a, and a margin of the second internal electrode in a width direction is c, a ratio (a/b) of the margin (a) of the second internal electrode in the longitudinal direction to the margin (b) of the first internal electrode in the longitudinal direction is 0.33 or more (where, a>0 and b>0) or a ratio (c/d) of the margin (c) of the second internal electrode in the (Continued)

width direction to the margin (d) of the first internal electrode in the width direction is 0.33 or more (where, c>0 and d>0).

38 Claims, 11 Drawing Sheets

(51) Int. Cl.
  *H01G 4/12* (2006.01)
  *H01G 4/012* (2006.01)
(58) Field of Classification Search
  USPC ............. 361/303, 301.4, 321.1, 304, 321.2
  See application file for complete search history.

(56) References Cited

U.S. PATENT DOCUMENTS

| | | | |
|---|---|---|---|
| 8,675,341 B2 | 3/2014 | Akazawa et al. | |
| 2012/0188684 A1* | 7/2012 | Akazawa | H01G 4/005 361/321.2 |
| 2012/0307414 A1 | 12/2012 | Kim et al. | |
| 2012/0327557 A1* | 12/2012 | Ahn | H01G 2/065 361/321.3 |
| 2013/0135787 A1* | 5/2013 | Lim | H01G 4/0085 29/25.42 |
| 2013/0342081 A1* | 12/2013 | Kuroda | H01C 7/18 336/200 |
| 2014/0301014 A1 | 10/2014 | Kim | |
| 2015/0114705 A1 | 4/2015 | Ahn et al. | |

FOREIGN PATENT DOCUMENTS

| | | |
|---|---|---|
| CN | 104576056 A | 4/2015 |
| JP | 2012-190874 A | 10/2012 |
| JP | 2012-209493 A | 10/2012 |
| JP | 2013-165211 A | 8/2013 |
| KR | 10-2014-0095270 A | 11/2014 |

* cited by examiner

MULTI-LAYERED CERAMIC CAPACITOR

CROSS-REFERENCE TO RELATED APPLICATION(S)

This application claims the benefit of priority to Korean Patent Application No. 10-2019-0086398 filed on Jul. 17, 2019 in the Korean Intellectual Property Office, the disclosure of which is incorporated herein by reference in its entirety.

TECHNICAL FIELD

The present disclosure relates to a multilayer ceramic capacitor.

BACKGROUND

A multilayer ceramic capacitor MLCC is one type of passive component, which controls an electrical signal on a circuit. A main role of such a multilayer ceramic capacitor is to accumulate charges in electrodes, to block direct current (DC) signals, and to pass alternating current (AC) signals. That is, such a multilayer ceramic capacitor can be seen to play a role in stabilizing an operation of an IC by bypassing and removing AC noise from a power line.

The MLCC device may have characteristic deterioration due to a cross talk phenomenon as an electromagnetic distance of each layer is reduced.

In particular, there is a problem in that the electric field characteristics are more likely to be weakened when a single integrated chip is used, as compared with a case of simply connecting the individual single components in parallel.

SUMMARY

An aspect of the present disclosure is to prevent deterioration of electric field characteristics due to cross talk.

Another aspect of the present disclosure is to significantly reduce an influence of a fringing field applied to an internal electrode.

Another aspect of the present disclosure is to reduce noise caused by unwanted electric field signals.

According to an aspect of the present disclosure, a multilayer ceramic capacitor includes a body including a dielectric layer and first and second internal electrodes having different sizes to each other, and having first and second surfaces opposing each other in a stacking direction, third and fourth surfaces connected to the first and second surfaces and opposing each other, and fifth and sixth surfaces connected to the first and second surfaces and connected to the third and fourth surfaces, and opposing each other; and first and second external electrodes, and when a margin of the first internal electrode in a longitudinal direction is b and a margin of the second internal electrode in a longitudinal direction is a, a ratio (a/b) of the margin (a) of the second internal electrode in the longitudinal direction to the margin (b) of the first internal electrode in the longitudinal direction may be 0.33 or more (where, a>0 and b>0).

According to another embodiment of the present disclosure, a multilayer ceramic capacitor includes a body including a dielectric layer and first and second internal electrodes having different sizes to each other, and having first and second surfaces opposing each other in a stacking direction, third and fourth surfaces connected to the first and second surfaces and opposing each other, and fifth and sixth surfaces connected to the first and second surfaces and connected to the third and fourth surfaces and opposing each other; and first and second external electrodes, and when a margin of the first internal electrode in a width direction is d and a margin of the second internal electrode in a width direction is c, a ratio (c/d) of the margin(c) of the second internal electrode in the width direction to the margin (d) of the first internal electrode in the width direction may be 0.33 or more (where, c>0 and d>0).

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
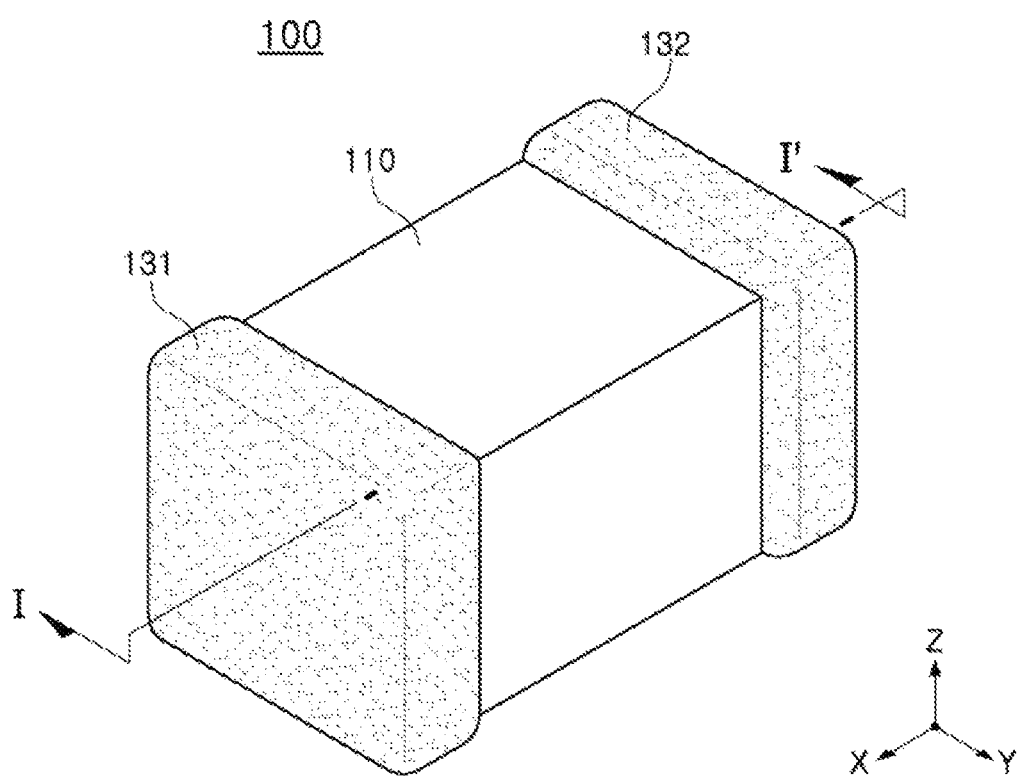
FIG. 1 is a schematic perspective view of a multilayer ceramic capacitor according to an embodiment of the present disclosure.
Figure 2:
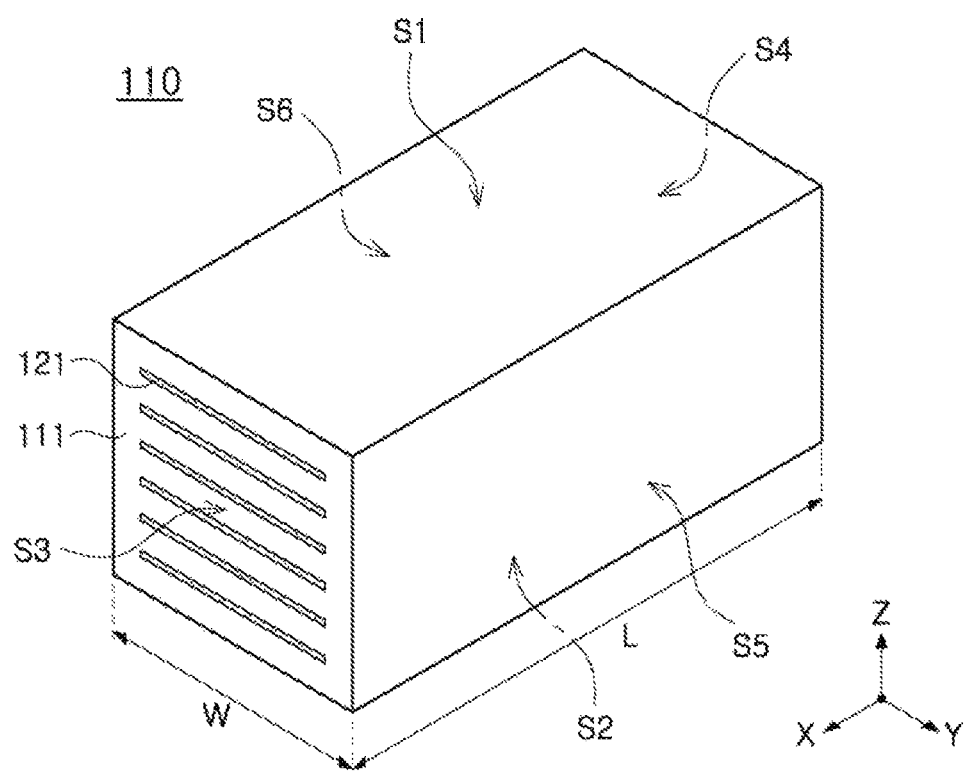
FIG. 2 is a schematic perspective view of a body of a multilayer ceramic capacitor of FIG. 1.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be through and complete, and will fully convey the scope of the disclosure to those skilled in the art. Accordingly, shapes and sizes of elements in the drawings may be exaggerated for clarity of description, and elements indicated by the same reference numeral are same elements in the drawings.

Throughout the specification, when a component is referred to as "comprise" or "comprising," it means that it may include other components as well, rather than excluding other components, unless specifically stated otherwise.

Hereinafter, when a direction of a capacitor body 110 is defined to clearly explain an embodiment in the present disclosure, X,Y and Z shown in the figure represent a longitudinal direction (second direction), a width direction (third direction), and a thickness direction (first direction) of the capacitor body 110, respectively. Further, in the present embodiment, the Z direction may be conceptually the same as a stacking direction or a lamination direction in which dielectric layers are stacked and laminated.

Figure 3:
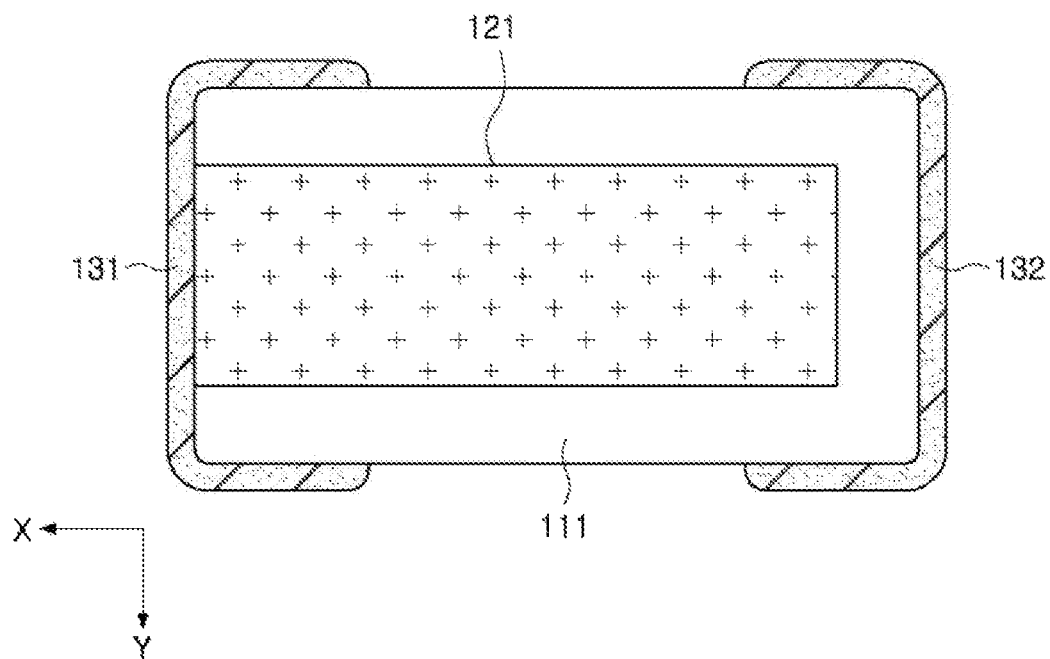
FIGS. 3 and 4 are plan views illustrating first and second internal electrodes respectively applied to the multilayer ceramic capacitor of FIG. 1.
Figure 4:
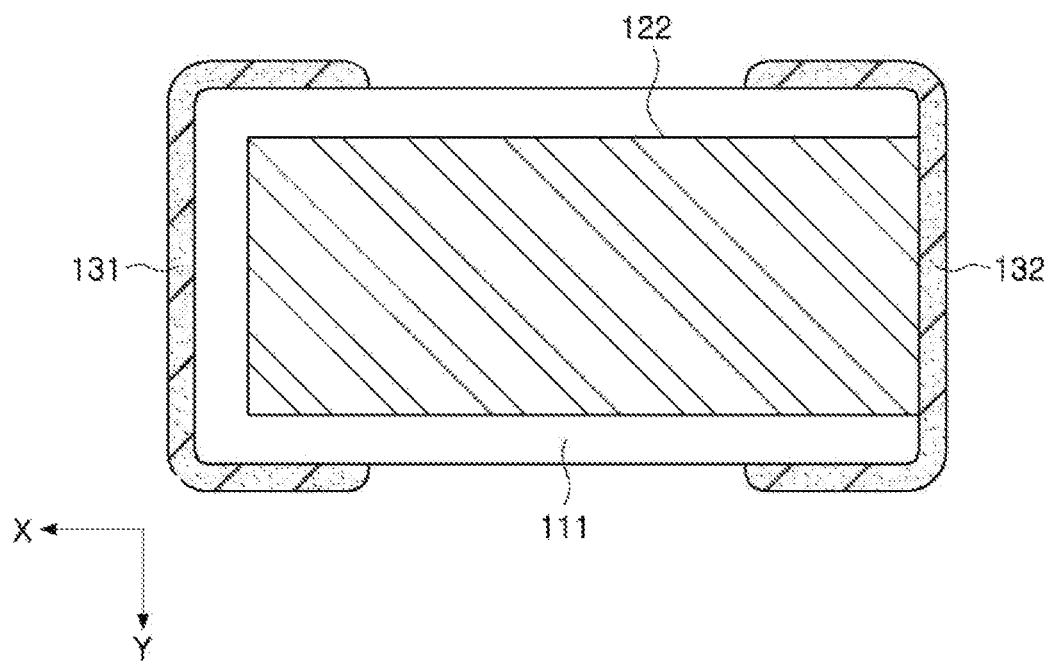
Figure 5:
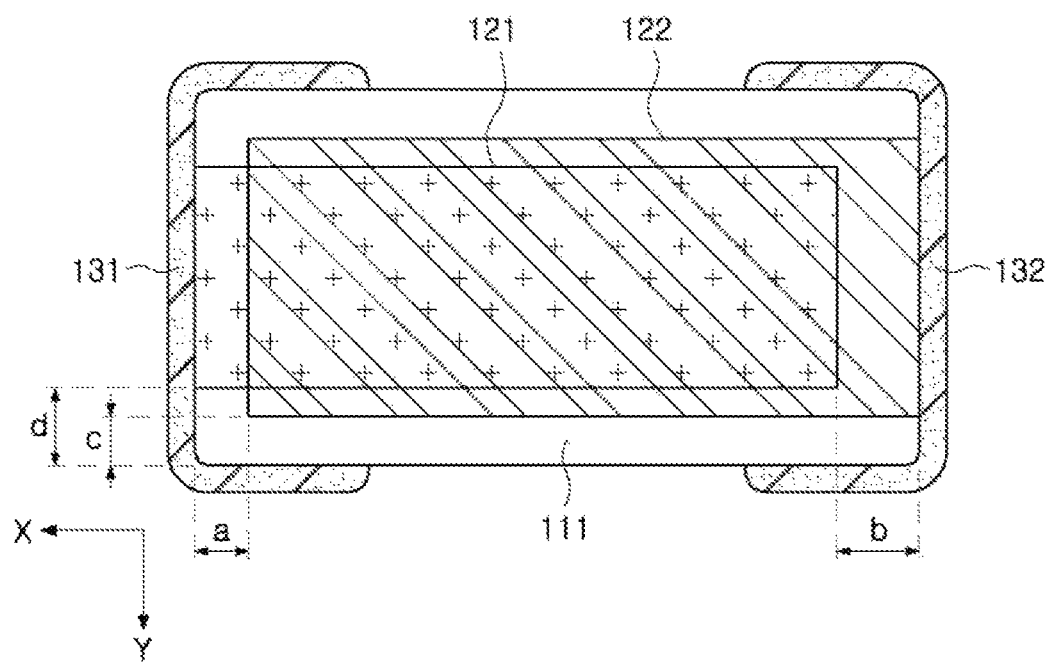
FIG. 5 is a plan view of overlap of the first and second internal electrodes applied to the multilayer ceramic capacitor of FIG. 1.

FIG. 1 is a schematic perspective view of a multilayer ceramic capacitor according to an embodiment of the present disclosure, FIGS. 3 and 4 are plan views illustrating first and second internal electrodes respectively, applied to the multilayer ceramic capacitor of FIG. 1, and FIG. 5 is a plan view overlapping the first and second internal electrodes applied to the multilayer ceramic capacitor of FIG. 1.

Referring to FIGS. 1 to 5, a multilayer ceramic capacitor according to an embodiment of the present disclosure includes a body 110 including a dielectric layer 111 and first and second internal electrodes 121 and 122 having different sizes to each other, and having first and second surfaces S1 and S2 opposing each other in a stacking direction, third and fourth surfaces S3 and S4 connected to the first and second surfaces S1 and S2 and opposing each other, and fifth and sixth surfaces S5 and S6 connected to the first and second surfaces S1 and S2 and connected to the third and fourth surfaces S3 and S4, and opposing each other; and first and second external electrodes 131 and 132.

In this case, when a margin of the first internal electrode 121 in a longitudinal direction is b, and a margin of the second internal electrode 122 in a longitudinal direction is a, a ratio (a/b) of the margin (a) of the second internal electrode 122 in the longitudinal direction to the margin (b) of the first internal electrode 121 in the longitudinal direction may be 0.33 or more (where, a>0 and b>0).

In the multilayer ceramic capacitor according to the present disclosure, when the ratio (a/b) of the margin in the longitudinal direction and/or the ratio (c/d) of the margin in the width direction described later falls within a predetermined range, cross talk that may occur due to a fringing effect may be prevented as described later, thereby preventing deterioration of electric field characteristics. The fringing effect refers to an effect caused by lines of electric force diverging and converging circularly at an electrode end of the parallel plate capacitor, which may cause cross talk when an unwanted electric field signal is transferred to another port. This phenomenon is likely to occur when a plurality of small chips are mounted in a narrow area, or when several components are merged into a single chip. The multilayer ceramic capacitor of the present disclosure may solve this problem. A size of a fringing field may be reduced by a plurality of internal electrodes as a compensation pattern to each other, thereby preventing deterioration of electric field characteristics and generation of noise.

In the present specification, "margin" may mean a difference in a size between the dielectric layer and the internal electrode, and may mean a distance between an end of the internal electrode and an end of the dielectric layer. In addition, in the present specification, "margin in the longitudinal direction" may mean the shortest distance from the end of the internal electrode in the longitudinal direction (second direction, X direction) to the end of the dielectric layer in the longitudinal direction (second direction, X direction), and may mean the shortest distance to the third surface S3 or the fourth surface S4 of the above-described body. In the present specification, "margin in the width direction" may mean a distance from the end of the internal electrode in the width direction (third direction, Y direction) to the end of the dielectric layer in the width direction (third direction, Y direction), and may mean the shortest distance to the fifth surface S5 or the sixth surface S6 of the above-described body.

Figure 12:
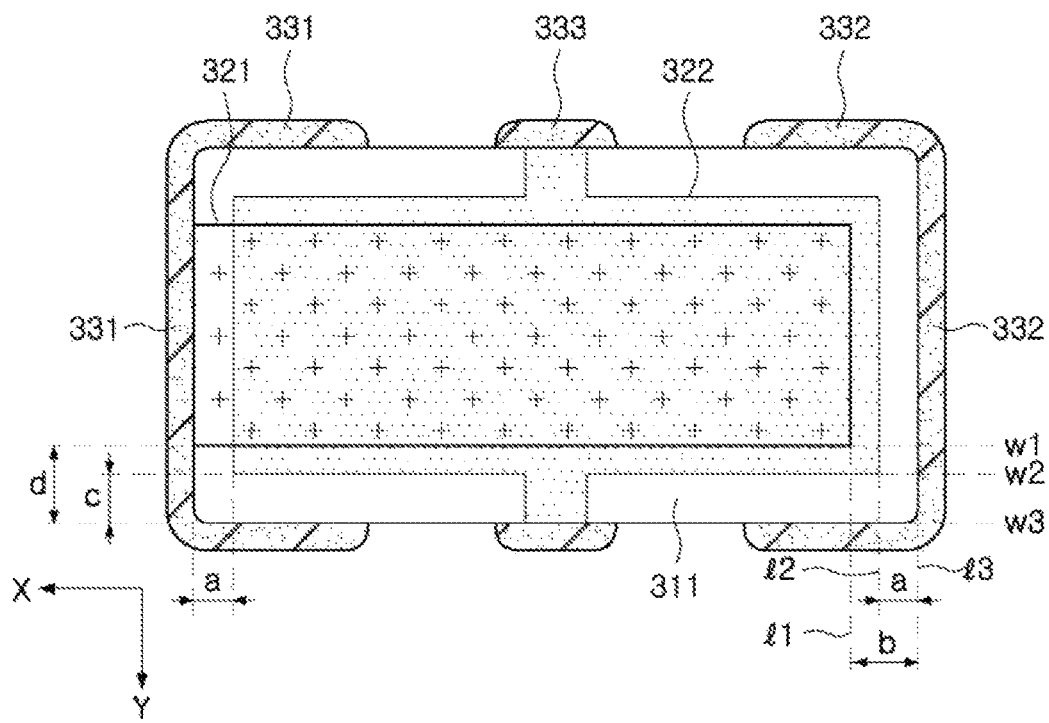
FIG. 12 is a plan view overlapping first and second internal electrodes of an embodiment which may be applied to the multilayer ceramic capacitors of FIGS. 9 and 10.

FIG. 12 is a cross-sectional view of a multilayer ceramic capacitor in which a first internal electrode 321 and a second internal electrode 322 are disposed. Referring to FIG. 12, a margin (b) of the first internal electrode 321 in a longitudinal direction refers to the shortest distance from a position l1 to a position l3, and a margin (a) of the second internal electrode 322 in a longitudinal direction refers to the shortest distance from a position l2 to a position l3. In addition, a margin d of the first internal electrode 321 in a width direction refers to the shortest distance from a position w1 to a position w3, and a margin c of the second internal electrode 322 refers the shortest distance from a position w2 to a position w3.

The capacitor body 110 is formed by laminating a plurality of dielectric layers 111 in the Z direction and then firing the plurality of dielectric layers 111, a boundary between the adjacent dielectric layers 111 of the capacitor body 110 maybe integrated, such that it may be difficult to confirm without using a scanning electron microscope (SEM).

The specific shape of the body is not particularly limited, but as illustrated, the body may be formed in a hexahedral shape or a similar shape. Due to shrinkage of the ceramic powder contained in the body during a firing process, the body may have a substantially hexahedral shape, although not a hexahedral shape with a completely straight line. In addition, the shape and dimensions of the capacitor body 110 and the number of laminated layers of the dielectric layer 111 are not limited to those illustrated in the drawings of the present embodiment.

In the present embodiment, for convenience of explanation, both surfaces of the capacitor body 110, opposing each other in the Z direction are defined as first and second surfaces S1 and S2, both surfaces connected to the first and second surfaces S1 and S2 and opposing each other in the X direction are defined as third and fourth surfaces S3 and S4, and both surfaces connected to the first and second surfaces S1 and S2 and connected to the third and fourth surfaces S3 and S4 and opposing each other in the Y direction are defined as fifth and sixth surfaces S5 and S6.

According to an embodiment of the present disclosure, a raw material for forming the dielectric layer 111 is not particularly limited as long as sufficient electrostatic capacitance may be obtained therewith. For example, the raw material for forming the dielectric layer 511 may be a barium titanate($BaTiO_3$) material, a lead composite perovskite material, a strontium titanate ($SrTiO_3$) material, or the like.

In addition, a material for forming the dielectric layer 111, various ceramic additives, organic solvents, plasticizers, binders, dispersants, and the like, may be added to powders such as barium titanate ($BaTiO_3$) according to the purpose of the present disclosure.

As the ceramic additive, for example, a transition metal oxide or a transition metal carbide, a rare earth element, magnesium (Mg), aluminum (Al), or the like, may be used.

In an example of the present disclosure, the plurality of internal electrodes 121 and 122 having different sizes to each other may be alternately disposed with the dielectric layer 111 interposed therebetween. In this case, the first and second internal electrodes 121 and 122 may be electrically separated from each other by the dielectric layer 111 disposed in the middle.

A material for forming the first and second internal electrodes 131 ad 122 is not particularly limited, and may be formed using a conductive paste including one or more materials, for example, of silver (Ag), palladium (Pd), gold (Au), platinum (Pt), nickel (Ni), copper (Cu), tin (Sn), tungsten (W), palladium (Pd), titanium (Ti) and alloys thereof. As a printing method of the conductive paste, a screen printing method or a gravure printing method may be used, but the present disclosure is not limited thereto.

An average thickness of the first and second internal electrodes 121 and 122 may be 0.4 µm or less . The average thickness of the internal electrode may be an average of values measured at five different positions of the fired internal electrode. A lower limit of the average thickness of the first and second internal electrodes is not particularly limited, but may be, for example, 0.01 µm or more.

In an embodiment of the present disclosure, a ratio (a/b) of the margin (b) of the first internal electrode 121 in the longitudinal direction and the margin (a) of the second internal electrode 122 may be 0.33 or more. When a ratio (a/b) of the margin (b) of the first internal electrode 121 in the longitudinal direction and the margin(a) of the second internal electrode 122 in the longitudinal direction is 0.33 or more, the second internal electrode sufficiently functions as a compensation pattern and cross talk may be reduced. When the ratio (a/b) is less than 0.33, a distance from the external electrode may be too close and a short may occur.

In an example, an upper limit of the ratio (a/b) of the margin (b) of the first internal electrode 121 in the longitudinal direction and the margin (a) of the second internal electrode 122 in the longitudinal direction is not particularly limited, however, may be, for example, less than 1. When the ratio (a/b) is 1, the second internal electrode 122 may not function as a compensation pattern. The ratio (a/b) of the margin (b) of the first internal electrode in the longitudinal direction and the margin (a) of the second internal electrode in the longitudinal direction may be less than 1, e.g., 0.95 or less, 0.85 or less, 0.80 or less, 0.75 or less, 0.70 or less, or 0.67 or less. The ratio (a/b) of the margin (b) of the first internal electrode in the longitudinal direction and the margin (a) of the second internal electrode in the longitudinal direction satisfy the above range, thereby significantly reducing an impact of a fringing field applied to the end of the internal electrode, and significantly reducing cross talk. The ratio (a/b) of the margin (b) of the first internal electrode in the longitudinal direction to the margin (a) of the second internal electrode in the longitudinal direction satisfy the above range, thereby significantly reducing an impact of a fringing field applied to the end of the internal electrode, and significantly reducing cross talk.

In an embodiment according to the present disclosure, a difference (b−a) between the margin (b) of the first internal electrode in the longitudinal direction and the margin (a) of the second internal electrode in the longitudinal direction may be 10 µm or more. The difference (b−a) between the margin (b) of the first internal electrode in the longitudinal direction and the margin (a) of the second internal electrode in the longitudinal direction may mean a difference in the length of the margin (b) of the first internal electrode in the longitudinal direction and the length of the margin (a) of the second internal electrode in the longitudinal direction, and may mean a difference in lengths in the X direction. By making the difference (b−a) between the margin (b) of the first internal electrode in the longitudinal direction and the margin (a) of the second internal electrode in the longitudinal direction 10 µm or more, noise of the multilayer ceramic capacitor may be effectively reduced.

The difference (b−a) of the margin (b) of the first internal electrode in the longitudinal direction and the margin (a) of the second internal electrode in the longitudinal direction may be, for example, 10 µm or more, 14 µm or more, 18 µm or more, 22 µm or more, 26 µm or more or 30 um, and an upper limit is not particularly limited, for example, may be 500 µm or less. When the difference (b−a) of the margin (b) of the first internal electrode in the longitudinal direction and the margin (a) of the second internal electrode in the longitudinal direction satisfies the above-described range, a noise removing effect may be maximized.

In another embodiment of the present disclosure, when a margin of the first internal electrode in the width direction is d and a margin of the second internal electrode in the width direction is c, a ratio (c/d) of the margin (d) of the first internal electrode in the width direction and the margin (c) of the second internal electrode in the width direction may be 0.33 or more (where, c>0 and d>0). Cross talk may be reduced in a range in which the ratio (c/d) of the margin (d) of the first internal electrode in the width direction and the margin (c) of the second internal electrode in the width direction is 0.33 or more. When the ratio (c/d) is less than 0.33, a distance between the external electrodes may be excessively close, and a short may occur.

In an example, an upper limit of the ratio (c/d) of the margin (d) of the first internal electrode in the width direction and the margin (c) of the second internal electrode in the width direction is not particularly limited, but may be, for example, less than 1. When the ratio (c/d) is 1, the second internal electrode may not function as a compensation pattern. When the ratio (c/d) of the margin (d) of the first internal electrode in the width direction and the margin (c) of the second internal electrode in the width direction may be less than 1, 0.95 or less, 0.85 or less, 0.80 or less, 0.75 or less, 0.70 or less, or 0.67 or less. The ratio (c/d) of the margin (d) of the first internal electrode in the width direction and the margin (c) of the second internal electrode in the width direction satisfies the above range, such that an impact of a fringing field applied to the end of the internal electrode may be significantly reduced, and cross talk may be significantly reduced.

In an embodiment according to the present disclosure, a difference (d−c) between the margin d of the first internal electrode in the width direction and the margin c of the second internal electrode in the width direction may be 10 µm or more. The difference (d−c) between the margin (d) of the first internal electrode in the width direction and the margin (c) of the second internal electrode in the width direction may mean the difference between the width of the margin (d) of the first internal electrode in the width direction and the margin (c) of the second internal electrode in the width direction, and may mean the difference of the width in the Y direction. By making the difference (d−c) between the margin (d) of the first internal electrode in the width direction and the margin (c) of the second internal electrode in the width direction to be 10 μm or more, the noise of the multilayer ceramic capacitor may be effectively reduced.

The difference (d–c) between the margin (d) of the first internal electrode in the width direction and the margin (c) of the second internal electrode in the width direction may be, for example, 10 μm or more, 14 μm or more, 18 μm or more, 22 μm or more, 26 μm or more or 30 μm or more, and an upper limit thereof is not particularly limited, but may be, for example, 500 μm or less. When the difference (d–c) between the margin (d) of the first internal electrode in the width direction and the margin (c) of the second internal electrode in the width direction satisfies the above-described range, a noise removing effect may be maximized.

The first and second external electrodes 131 and 132 may be disposed to contact the first and second internal electrodes, respectively. The first and second external electrodes are in contact with the first and second internal electrodes, respectively, which may mean that the first internal electrode is connected to the first external electrode through a portion exposed to an outside of the body, and may mean that the second internal electrode is connected to the second external electrode through a portion exposed to an outside of the body. The first and second external electrodes 131 and 132 may be extended and disposed on a portion of four surfaces in contact with a surface in which the first and second internal electrodes are exposed.

A method of forming the first and second external electrodes 131 and 132 need not be particularly limited. For example, the first and second external electrodes 131 and 132 may be formed by dipping a body into a paste including a conductive metal and glass, or by transferring a dry film obtained by drying a metal paste on the body.

In an embodiment of the present disclosure, the first and second external electrodes 131 and 132 may be one or more of silver (Ag), palladium (Pd), gold (Au), platinum (Pt), nickel (Ni), copper (Cu), tin (Sn), tungsten (W), palladium (Pd), titanium (Ti), and alloys thereof. In addition, in order to improve mountability with the substrate, a plating layer may be formed on the first and second external electrodes 131 and 132.

In an embodiment of the present disclosure, the first and second internal electrodes may be disposed to be exposed to the third and fourth surfaces of the body, respectively. The first and second internal electrodes are exposed to the third and fourth surfaces of the body, which may mean that the first internal electrode and the second internal electrode are disposed to oppose each other in the X direction, and may mean that the first and second internal electrodes are disposed in the longitudinal direction. In this case, the first external electrode 131 and the second external electrode 132 may be disposed on the third surface and the fourth surface of the body, respectively, to be in contact with the first internal electrode 121 and the second internal electrode 122.

FIGS. 1 to 5 illustrate a multilayer ceramic capacitor according to the embodiment. Referring to FIGS. 1 to 5, in a multilayer ceramic capacitor 100 according to the present embodiment, a first internal electrode 121 and a second internal electrode 122, opposing each other in a X direction (longitudinal direction, second direction) may be disposed on the third surface S3 and the fourth surface S4 of the body 110, respectively. In addition, the first external electrode 13 and the second external electrode 132 may be disposed on the third surface S3 and the fourth surface S4 of the body 110, respectively, to be connected to the first internal electrode 121 and the second internal electrode 122, respectively. When the multilayer ceramic capacitor according to the present embodiment has the above structure, the multilayer ceramic capacitor has an appearance similar to that of a conventional MLCC.

In another embodiment of the present disclosure, first and second internal electrodes may be disposed to be exposed to the fifth and sixth surfaces of the body. The first and second internal electrodes are exposed to the fifth and sixth surfaces of the body, which may mean that the first internal electrode and the second internal electrode are disposed to be opposed in a Y direction, and the first and internal electrode and the second internal electrode are disposed in a width direction. In this case, a first external electrode and a second external electrode may be disposed on the fifth and sixth surfaces of the body, respectively. The first external electrode and the second external electrode may be disposed on the fifth and sixth surfaces of the body to contact the first and second internal electrodes, respectively.

Figure 6:
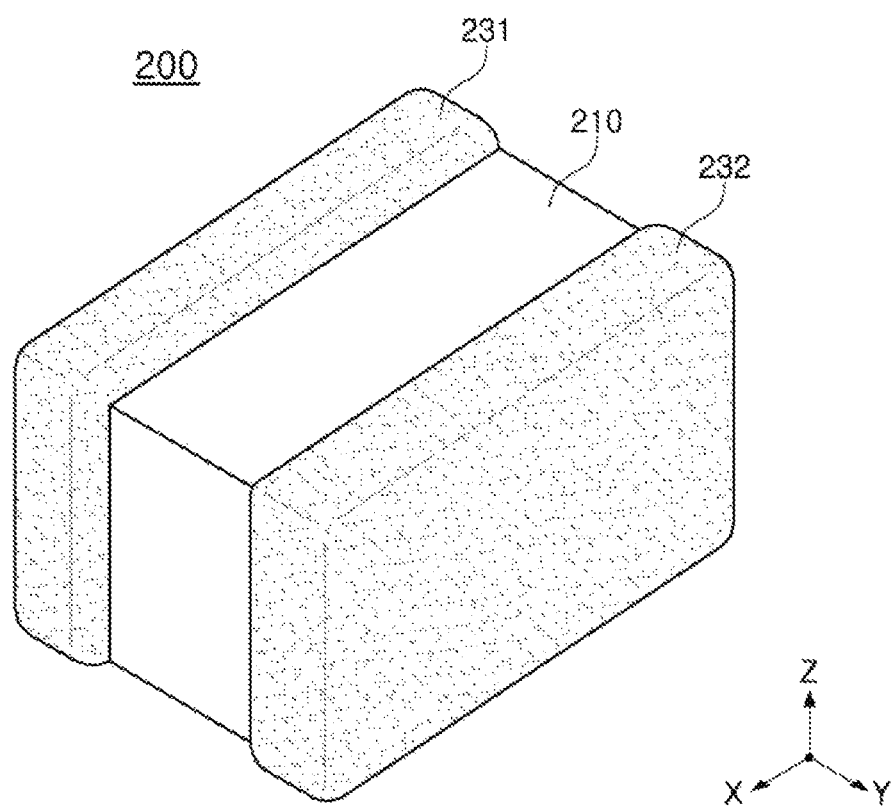
FIG. 6 is a schematic perspective view of a multilayer ceramic capacitor according to another embodiment of the present disclosure.
Figure 7:
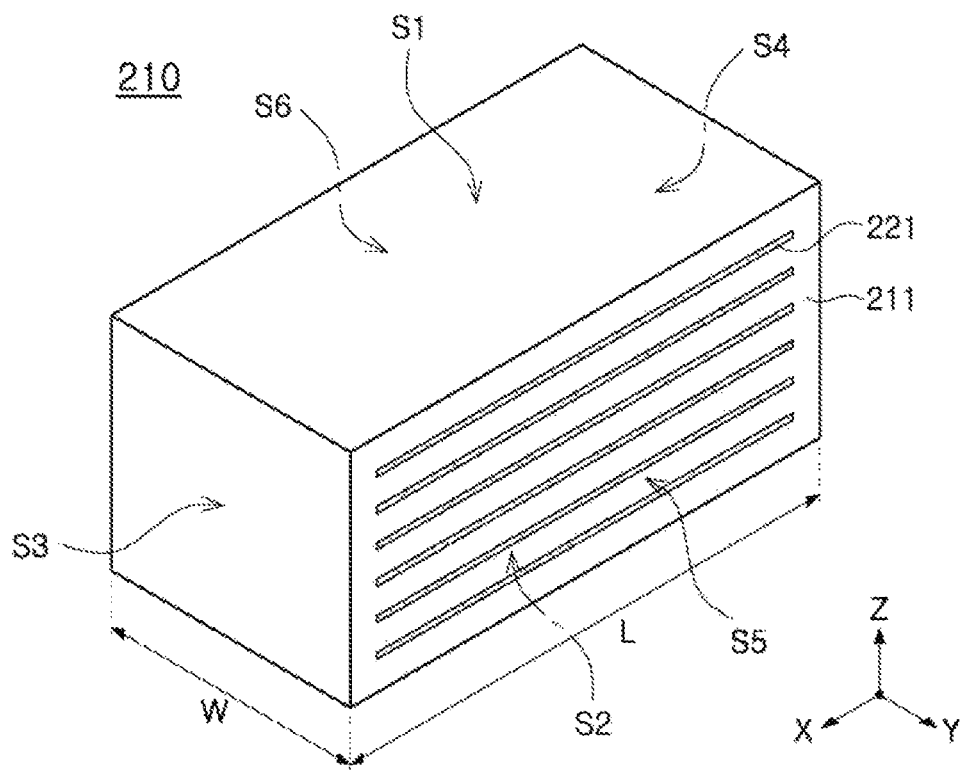
FIG. 7 is a schematic perspective view illustrating a body of the multilayer ceramic capacitor of FIG. 6.
Figure 8:
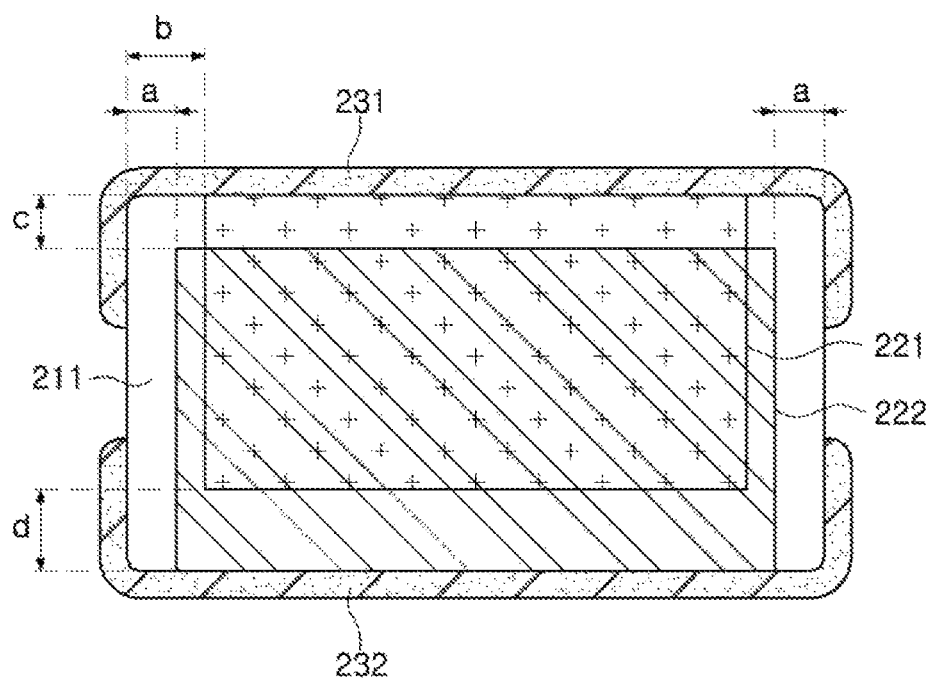
FIG. 8 is a plan view overlapping first and second internal electrodes applied to the multilayer ceramic capacitor of FIG. 6.

FIGS. 6 to 8 illustrate a multilayer ceramic capacitor according to the embodiment. Referring to FIGS. 6 to 8, in a multilayer ceramic capacitor 200 according to the present embodiment, a first internal electrode 221 and a second internal electrode 222, opposing each other in a Y direction (width direction, third direction) may be disposed on the fifth surface S5 and the sixth surface S6 of the body 210, respectively. In addition, the first external electrode 231 and the second external electrode 232 may be disposed on the fifth surface S5 and the sixth surface S6 of the body 210, respectively, such that the first external electrode 231 and the second external electrode 232 may be connected to the first internal electrode 221 and the second internal electrode 222, respectively, to each other. When the multilayer ceramic capacitor according to the present embodiment has the above structure, the multilayer ceramic capacitor may have an appearance similar to that of a low inductance chip capacitor (LICC).

In another embodiment of the present disclosure, the multilayer ceramic capacitor of the present disclosure may further include a third external electrode, and the first internal electrode may be exposed to the third surface or the fourth surface of the body, and the second internal electrode may be disposed to be exposed to the fifth and sixth surfaces of the body. In this case, the first external electrode may be disposed on the third surface of the body, the second external electrode may be disposed on the fourth surface of the body, and the third external electrode may be connected to the second internal electrode and may be disposed on the first surface, the second surface, the fifth surface, and the sixth surface of the body.

Figure 13:
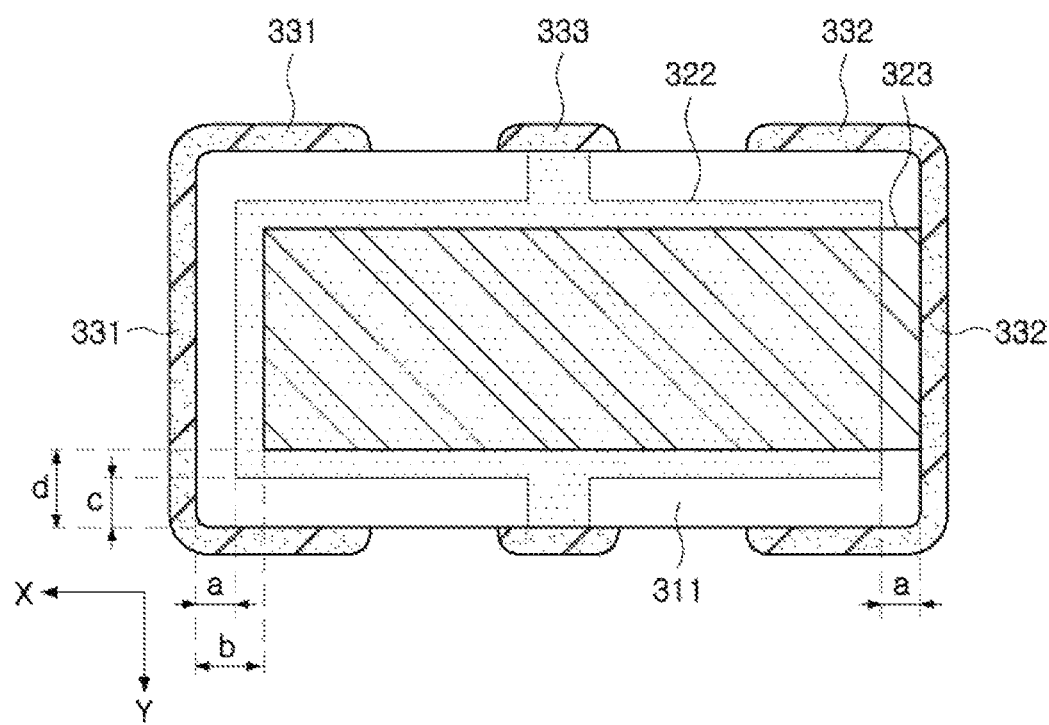
FIG. 13 is a plan view overlapping first and second internal electrodes of another embodiment which may be applied to the multilayer ceramic capacitors of FIGS. 9 and 10.
Figure 14:
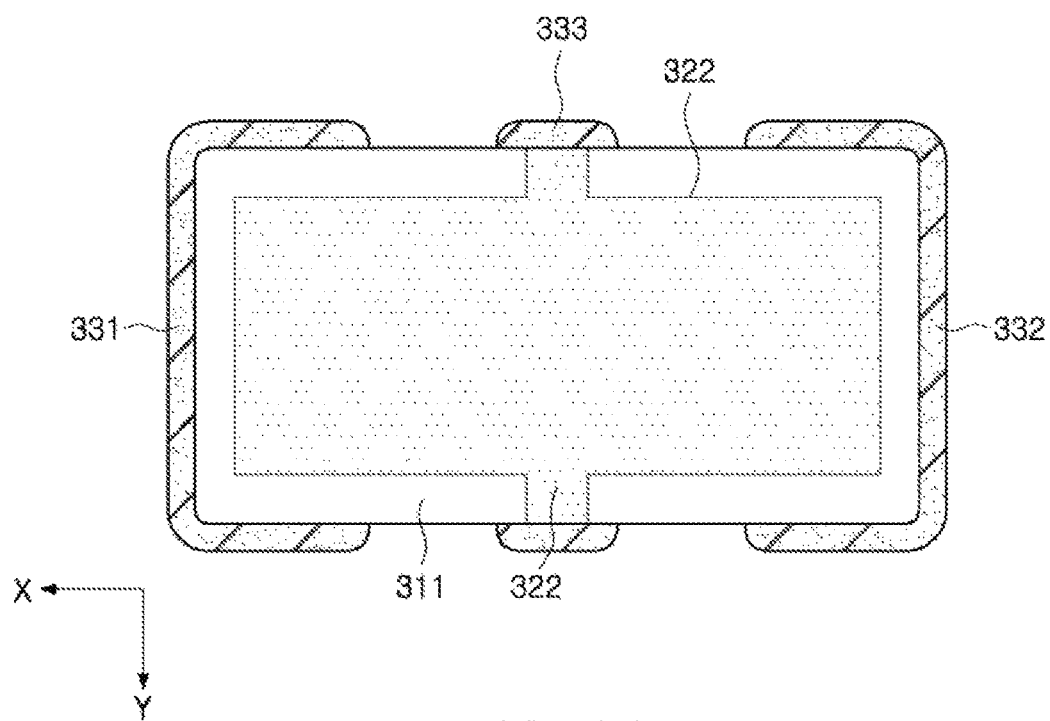
FIG. 14 is a plan view illustrating a second internal electrode applied to the multilayer ceramic capacitors of FIGS. 9 and 10.

FIGS. 9 to 14 illustrate a multilayer ceramic capacitor according to the present embodiment. Referring to FIGS. 9 to 13, in a multilayer ceramic capacitor 300 according to the present embodiment, the first internal electrode 321 may be exposed to the third surface S3 or the fourth surface S4 of the body 310, and the second internal electrode 322 maybe disposed to be exposed to the fifth surface S5 and the sixth surface S6 of the body 310. In addition, the first external electrode 331 and the second external electrode 332 may be respectively disposed on the third surface S3 and the fourth surface S4 of the body 310 to be connected to the first internal electrode 321. The third external electrode 333 may be disposed on the first surface S1, the second surface S2, the third surface S3, and the sixth surface S6 of the body 310. In this case, the second internal electrode 322 disposed to be exposed to the fifth surface S5 and the sixth surface S6 of the body 310 may have a shape as shown in FIG. 13, and for example, it may be a + shape.

Figure 9:
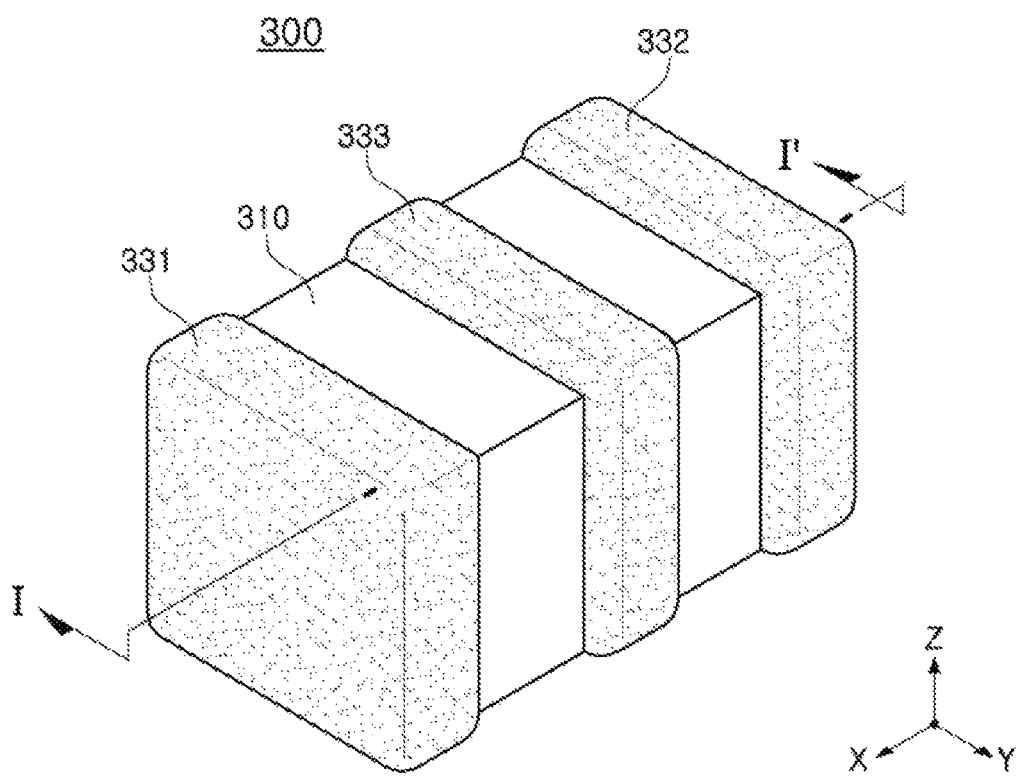
FIG. 9 is a schematic perspective view of a multilayer ceramic capacitor according to another embodiment of the present disclosure.
Figure 10:
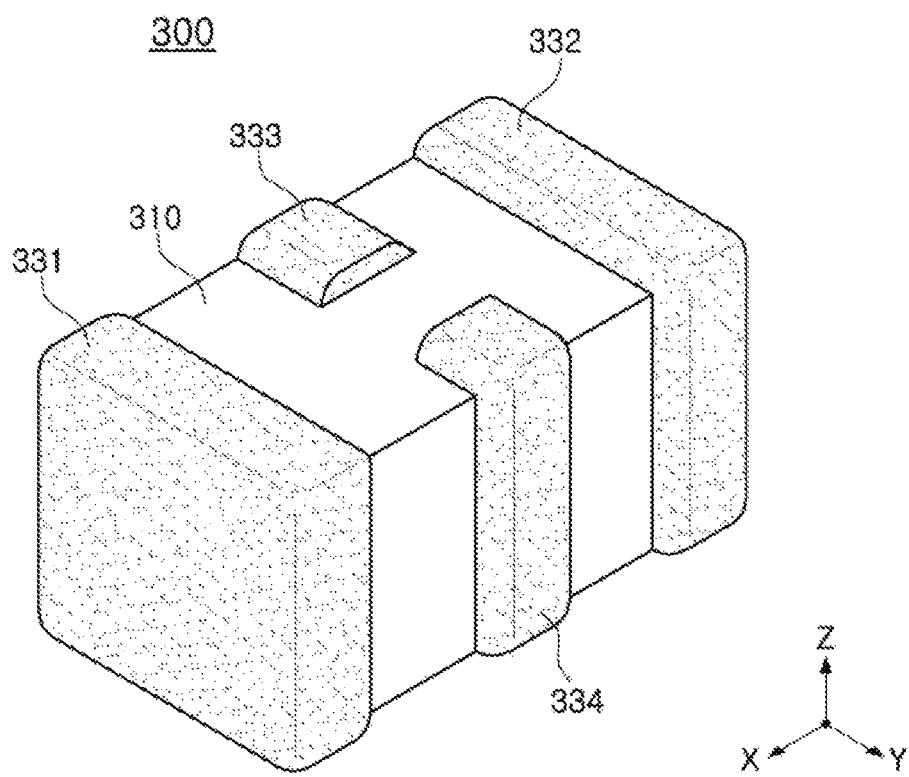
FIG. 10 is a schematic perspective view of a multilayer ceramic capacitor according to another embodiment of the present disclosure.
Figure 11:
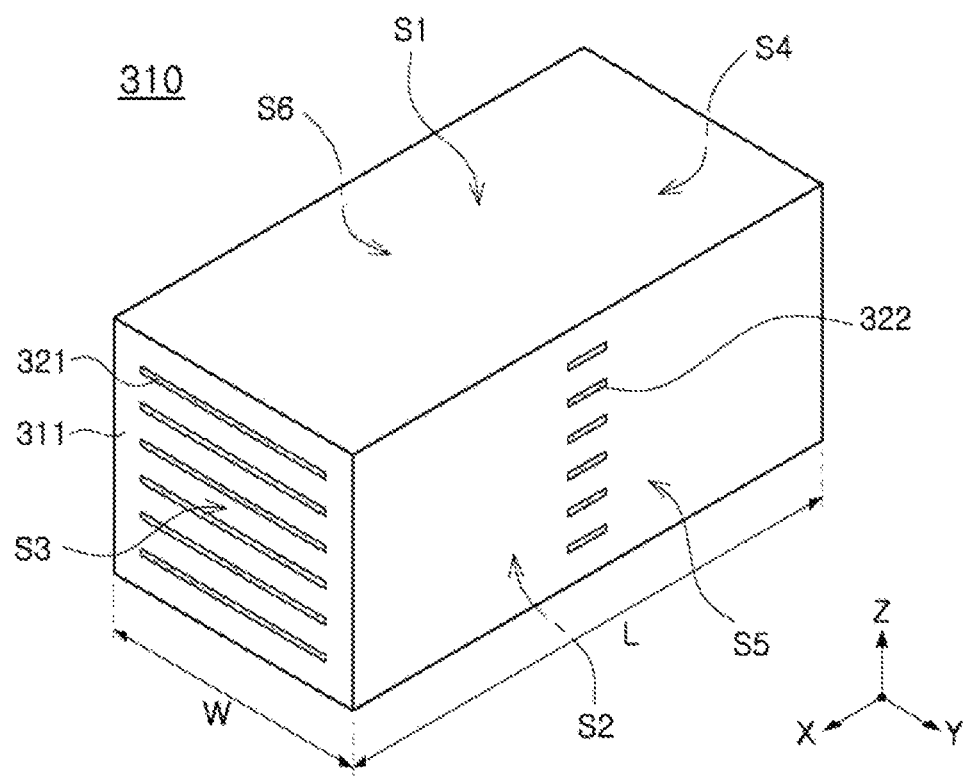
FIG. 11 is a schematic perspective view illustrating a body of the multilayer ceramic capacitors of FIGS. 9 and 10.

As illustrated in FIG. 9, the third external electrode 333 may be disposed to connect the first surface S1, the second surface S2, the fifth surface S5, and the sixth surface S6 of the body 310, and as illustrated in FIG. 10, may include a disconnection portion on the first surface S1 and the second surface S2, or may not be disposed on the first surface S1 and the second surface S2 of the body 310, but is not limited thereto.

In an example, the multilayer ceramic capacitor may further include a third internal electrode. In this case, the first internal electrode may be disposed to be exposed to the third surface of the body and to be in contact with the first external electrode, and the third internal electrode may be disposed to be exposed to the fourth surface of the body and in contact with the second external electrode.

Referring to FIGS. 9 to 14, in the above embodiment, the multilayer ceramic capacitor 310 may have a multilayer structure according to positions of the first internal electrode 321 and the third internal electrode 323. For example, the multilayer ceramic capacitor 310 according to the present embodiment may have a structure in which a plurality of the first internal electrode 321 and the second internal electrode 322 are alternately stacked, as illustrated in FIG. 12, and a plurality of the second internal electrode 322 and the third internal electrode 323 are stacked, as illustrated in FIG. 13 on the stacked structure. In this case, a stacking number of the structure of FIG. 12 and a stacking number of the structure of FIG. 13 may be appropriately adjusted according to a purpose of use of the capacitor.

In the above embodiment, although a stacked structure of the first internal electrode 321 of FIG. 12 is disposed below and a stacked structure of the third internal electrode 323 of FIG. 13 is disposed above, on the contrary, a structure in which a stacked structure of the first internal electrode 321 of FIG. 12 is disposed above and a stacked structure of the third internal electrode 323 of FIG. 13 is disposed below will naturally be included in the above example. When the multilayer ceramic capacitor according to the present embodiment has the above structure, the multilayer ceramic capacitor may have a three-terminal shaped capacitor, and one of the external electrodes may function as a ground electrode.

In another embodiment of the present disclosure, a multilayer ceramic capacitor according to the present disclosure further includes a third external electrode. The first internal electrode may be disposed to be exposed to the third and fourth surfaces of the body, and the second internal electrode may be disposed to be exposed to the fifth and sixth surfaces of the body. In this case, the first external electrode may be disposed on the third surface of the body, the second external electrode maybe disposed on the fourth surface of the body, and the third external electrode may be connected to the second internal electrode, and may be disposed on the first surface, the second surface, the fifth surface, and the sixth surface of the body.

Figure 15:
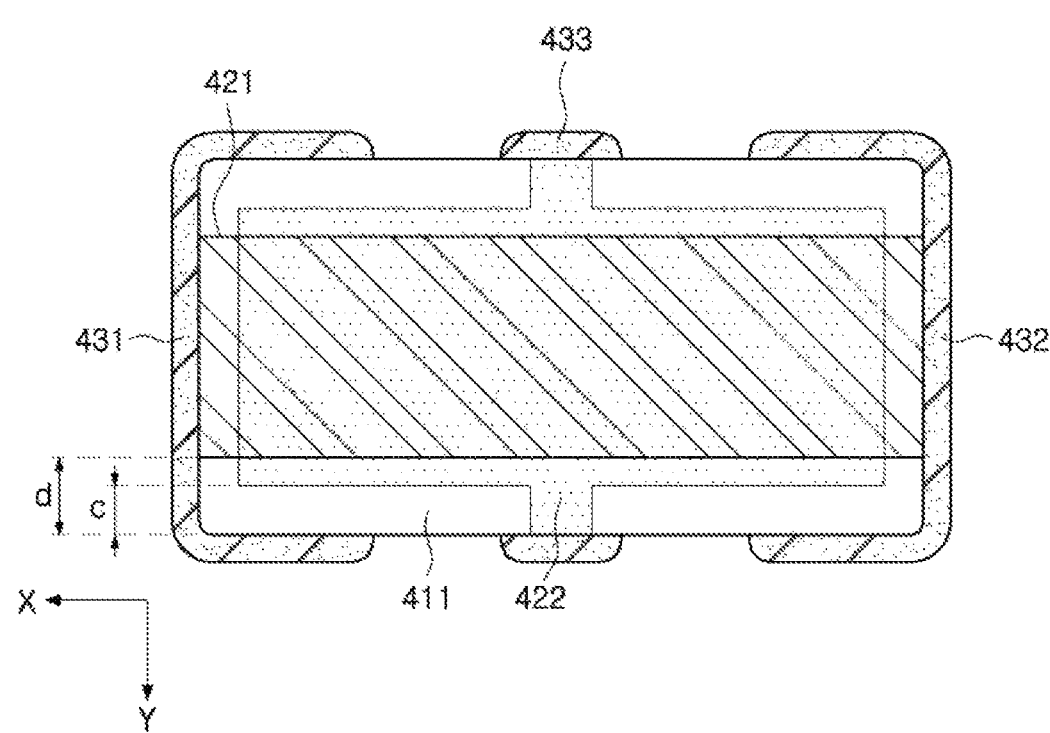
FIG. 15 is a plan view overlapping first and second internal electrodes of another embodiment which may be applied to the multilayer ceramic capacitors of FIGS. 9 and 10.

FIG. 15 is a cross-sectional view of a multilayer ceramic capacitor according to another embodiment. Referring to FIG. 15, a first internal electrode 421 may be exposed to a third surface S3 and a fourth surface S4 of the body, and may be in contact with a first external electrode 431 and a second external electrode 432. In addition, the second internal electrode 422 may be exposed to the fifth surface S5 and sixth surface S6 of the body, and may be in contact with the third external electrode 433.

When the multilayer ceramic capacitor includes a third internal electrode and a third external electrode, since the thickness and a method of forming the third internal electrode and the third external electrode, and the like, are the same as those of the first and second internal electrodes and the first and second external electrodes, the description thereof will be omitted.

Table 1 below shows a scattering coefficient (S21-parameter) according to a ratio of a/b or a ratio of c/d.

TABLE 1

| a/b or c/d | 1 | 0.917 | 0.833 | 0.667 | 0.5 | 0.333 |
|---|---|---|---|---|---|---|
| S21[dB]@10 MHz | −41.66 | −45.58 | −49.41 | −59.4 | −67.85 | −78.39 |
| Reduction rate | 0% | 9% | 19% | 43% | 63% | 88% |

Figure 16:
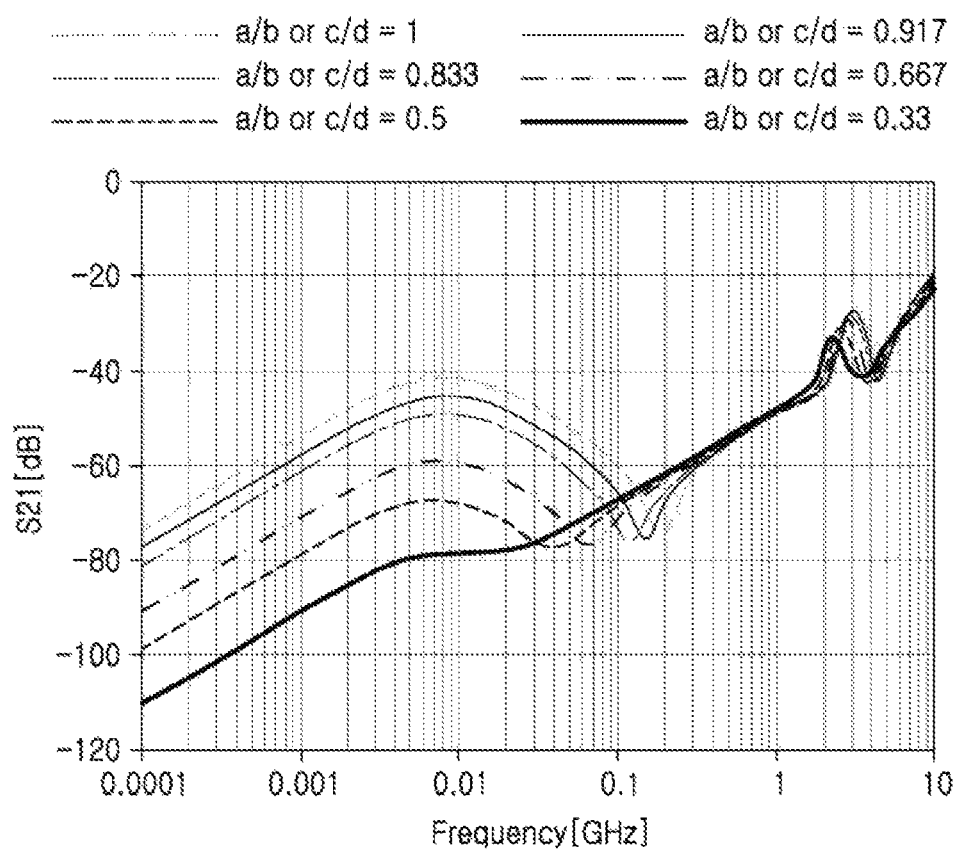
FIG. 16 is a graph illustrating a cross talk level (S21-parameter) according to a ratio of margins of the multilayer ceramic capacitor in a longitudinal and/or a width direction according to a multilayer ceramic capacitor of the present disclosure.

Referring to Table 1, when the ratio of (a/b or c/d) is 1, it can be confirmed that the same result is obtained as not applying a compensation pattern, and as the ratio (a/b or c/d) are lowered, a reduction rate is increased. In particular, it can be confirmed that a sharp numerical change appears based on 0.667. In addition, it can be confirmed that a very high reduction rate appears when the ratio (a/b or c/d) is 0.33. This is further illustrated in FIG. 16, which shows a graph illustrating a cross talk level (S21-parameter) according to a ratio of margins of the multilayer ceramic capacitor in a longitudinal and/or a width direction according to a multilayer ceramic capacitor of the present disclosure.

Through the above Table 1, in the multilayer ceramic capacitor according to the present disclosure, it can be confirmed that an influence of the fringing field applied to the end of the internal electrode may be significantly reduced and deterioration of electric field characteristics due to cross talk may be prevented, and noise caused by the unwanted electric field signals may be reduced, by using the second internal electrode as a compensation pattern.

As set forth, according to an embodiment of the present disclosure, it is possible to prevent deterioration of an electric field characteristic due to cross talk.

According to another embodiment of the present disclosure, an influence of a fringing field applied to an end of the internal electrode can be minimized.

According to another embodiment of the present disclosure, it is possible to provide a multilayer ceramic capacitor capable of reducing noised caused by unwanted electric field signals.

While the example embodiments have been shown and described above, it will be apparent to those skilled in the art that modifications and variations could be made without departing from the scope of the present invention as defined by the appended claims.

What is claimed is:

1. A multilayer ceramic capacitor, comprising:
   a body including a dielectric layer and first internal electrodes and second internal electrodes having different sizes to each other, and having first and second surfaces opposing each other in a stacking direction, third and fourth surfaces connected to the first and second surfaces and opposing each other, and fifth and sixth surfaces connected to the first and second surfaces and connected to the third and fourth surfaces, and opposing each other; and
   first and second external electrodes,
   wherein when a margin of at least two of the first internal electrodes in a longitudinal direction is b, and a margin of a second internal electrode, among the second internal electrodes, in a longitudinal direction is a, a ratio (a/b) is 0.667 or less and 0.33 or more (where, a>0 and b>0), and wherein a margin of the at least two of the first internal electrodes in a width direction is different than a corresponding margin of the second internal electrode in the width direction.

2. The multilayer ceramic capacitor of claim 1, wherein a difference (b−a) between the margin (b) and the margin (a) is 10 µm or more.

3. A multilayer ceramic capacitor, comprising:
a body including a dielectric layer and first internal electrodes and second internal electrodes having different sizes to each other, and having first and second surfaces opposing each other in a stacking direction, third and fourth surfaces connected to the first and second surfaces and opposing each other, and fifth and sixth surfaces connected to the first and second surfaces and connected to the third and fourth surfaces, and opposing each other; and
first, second, and third external electrodes,
wherein when a margin of at least two of the first internal electrodes in a width direction is d, and a corresponding margin of a second internal electrode, among the second internal electrodes, in a width direction is c, a ratio (c/d) is less than 1 and 0.33 or more (where, c>0 and d>0),
the first internal electrodes are connected to the third surface or the fourth surface of the body,
the second internal electrode is disposed to be connected to the fifth and sixth surfaces of the body,
the first external electrode is disposed on the third surface of the body,
the second external electrode is disposed on the fourth surface of the body, and
the third external electrode is connected to the second internal electrode and is disposed on the first, second, fifth, and sixth surfaces of the body.

4. The multilayer ceramic capacitor of claim 3, wherein the ratio (c/d) is 0.67 or less.

5. The multilayer ceramic capacitor of claim 3, wherein a difference (d−c) between the margin (d) and the margin (c) is 10 µm or more.

6. The multilayer ceramic capacitor of claim 1 or claim 3, wherein an average thickness of the first and second internal electrodes is 0.4 µm or less.

7. The multilayer ceramic capacitor of claim 1, wherein the first and second internal electrodes are connected to the third and fourth surfaces of the body, respectively, and
the first and second external electrodes are disposed on the third and fourth surfaces of the body to contact the first and second internal electrodes, respectively.

8. The multilayer ceramic capacitor of claim 1, wherein the first and second internal electrodes are connected to the fifth and sixth surfaces of the body, respectively, and
the first and second external electrodes are disposed on the fifth and sixth surfaces of the body to contact the first and second internal electrodes, respectively.

9. The multilayer ceramic capacitor of claim 1, further comprising a third external electrode,
wherein the first internal electrodes are connected to the third surface or the fourth surface of the body,
the second internal electrode is disposed to be connected to the fifth and sixth surfaces of the body,
the first external electrode is disposed on the third surface of the body,
the second external electrode is disposed on the fourth surface of the body, and
the third external electrode is connected to the second internal electrode and is disposed on the first, second, fifth, and sixth surfaces of the body.

10. The multilayer ceramic capacitor of claim 3 or claim 9, further comprising a third internal electrode,
wherein the first internal electrodes are connected to the third surface of the body and are disposed to contact the first external electrode, and
the third internal electrode is connected to the fourth surface of the body and is disposed to contact the second external electrode.

11. The multilayer ceramic capacitor of claim 1, further comprising a third external electrode,
wherein the first internal electrodes are connected to the third and fourth surfaces of the body,
the second internal electrode is disposed to be connected to the fifth and sixth surfaces of the body,
the first and second external electrodes are disposed on the third and fourth surfaces of the body, respectively, and are connected to the first internal electrodes, and
the third external electrode is connected to the second internal electrode, and is disposed on the first, second, fifth, and sixth surfaces of the body.

12. The multilayer ceramic capacitor of claim 1, wherein when a margin of at least two of the first internal electrodes in a width direction is d, and a margin of the second internal electrode in a width direction is c, a ratio (c/d) is 0.33 or more (where, c>0 and d>0).

13. The multilayer ceramic capacitor of claim 3, wherein when a margin of at least two of the first internal electrodes in a longitudinal direction is b, and a margin of the second internal electrode in a longitudinal direction is a, a ratio (a/b) is 0.33 or more (where, a>0 and b>0).

14. A multilayer ceramic capacitor comprising:
a body including first internal electrodes and second internal electrodes having a different size than the first internal electrodes stacked in a thickness direction with dielectric layers disposed therebetween, and having first and second surfaces opposing each other in the thickness direction; and
a first external electrode connecting the second internal electrodes and a second external electrode connecting the first internal electrodes,
wherein one or both of ratios a/b or c/d are 0.667 or less and 0.33 or more,
wherein
a is a distance between an end of a second internal electrode and an end of the dielectric layer taken in a longitudinal direction perpendicular to the thickness direction,
b is a distance between an end of at least two of the first internal electrodes and an end of the dielectric layer taken in the longitudinal direction,
c is a distance between an end of a second internal electrode and an end of the dielectric layer taken in a width direction perpendicular to the thickness direction and the longitudinal direction, and
d is a distance between an end of at least two of the first internal electrodes and an end of the dielectric layer taken in the width direction,
where all of a, b, c, and d are greater than zero,
wherein a margin of at least one of the first internal electrodes in the width direction is different than a corresponding margin of at least one of the second internal electrodes in the width direction.

15. The multilayer ceramic capacitor of claim 14, wherein an average thickness of the first and second internal electrodes is 0.4 μm or less.

16. The multilayer ceramic capacitor of claim 14, wherein both of a/b and c/d are in a range from 0.33 to 0.667.

17. The multilayer ceramic capacitor of claim 14, wherein one or both of (b–a) or (d–c) is 10 μm or more.

18. A multilayer ceramic capacitor, comprising:
a body including a dielectric layer and first and second internal electrodes having different sizes to each other, and having first and second surfaces opposing each other in a stacking direction, third and fourth surfaces connected to the first and second surfaces and opposing each other, and fifth and sixth surfaces connected to the first and second surfaces and connected to the third and fourth surfaces, and opposing each other; and
first and second external electrodes,
wherein when a margin of the first internal electrode in a longitudinal direction is b, and a margin of the second internal electrode in a longitudinal direction is a, a ratio (a/b) is 0.33 or more and 0.667 or less (where, a>0 and b>0),
wherein a margin of the first internal electrode in a width direction is different than a corresponding margin of the second internal electrode in the width direction, and
wherein the second internal electrode comprises a plurality of second internal electrodes and the first internal electrode is arranged between at least two of the plurality of second internal electrodes in the stacking direction.

19. The multilayer ceramic capacitor of claim 18, wherein the first internal electrode is arranged between one of the first or second surfaces, closest to the first and second internal electrodes in the stacking direction, and the second internal electrode in the stacking direction.

20. The multilayer ceramic capacitor of claim 18, wherein a difference (b–a) between the margin (b) and the margin (a) is 10 μm or more and 500 μm or less.

21. The multilayer ceramic capacitor of claim 18, wherein an average thickness of the first and second internal electrodes is 0.4 μm or less.

22. A multilayer ceramic capacitor, comprising:
a body including a dielectric layer and first and second internal electrodes having different sizes to each other, and having first and second surfaces opposing each other in a stacking direction, third and fourth surfaces connected to the first and second surfaces and opposing each other, and fifth and sixth surfaces connected to the first and second surfaces and connected to the third and fourth surfaces, and opposing each other; and
first, second, and third external electrodes,
wherein when a margin of the first internal electrode in a width direction is d, and a corresponding margin of the second internal electrode in a width direction is c, a ratio (c/d) is 0.33 or more and 0.67 or less (where, c>0 and d>0),
the second internal electrode comprises a plurality of second internal electrodes and the first internal electrode is arranged between at least two of the plurality of second internal electrodes in the stacking direction,
the first internal electrode is connected to the third and fourth surfaces of the body,
the second internal electrodes are disposed to be connected to the fifth and sixth surfaces of the body,
the first and second external electrodes are disposed on the third and fourth surfaces of the body, respectively, and are connected to the first internal electrode, and
the third external electrode is connected to the second internal electrodes, and is disposed on the first, second, fifth, and sixth surfaces of the body.

23. The multilayer ceramic capacitor of claim 22, wherein a difference (d–c) between the margin (d) and the margin (c) is 10 μm or more and 500 μm or less.

24. The multilayer ceramic capacitor of claim 22, wherein an average thickness of the first and second internal electrodes is 0.4 μm or less.

25. The multilayer ceramic capacitor of claim 22, wherein the first internal electrode is arranged between one of the first or second surfaces, closest to the first and second internal electrodes in the stacking direction, and the second internal electrode in the stacking direction.

26. A multilayer ceramic capacitor, comprising:
a body including a dielectric layer and a plurality of first and second internal electrodes having different sizes to each other, and having first and second surfaces opposing each other in a stacking direction, third and fourth surfaces connected to the first and second surfaces and opposing each other, and fifth and sixth surfaces connected to the first and second surfaces and connected to the third and fourth surfaces, and opposing each other; and
first and second external electrodes,
wherein when respective margins of the plurality of first internal electrodes in a longitudinal direction are b, and respective margins of the plurality of second internal electrodes in a longitudinal direction are a, a ratio (a/b) is 0.667 or less and 0.33 or more (where, a>0 and b>0), and
wherein the respective margins of the plurality of first internal electrodes in a width direction are different than respective, corresponding margins of the plurality of second internal electrodes in the width direction.

27. The multilayer ceramic capacitor of claim 26, wherein a difference (b–a) between the margin (b) and the margin (a) is 10 μm or more.

28. The multilayer ceramic capacitor of claim 26, wherein the first and second internal electrodes are connected to the third and fourth surfaces of the body, respectively, and
the first and second external electrodes are disposed on the third and fourth surfaces of the body to contact the first and second internal electrodes, respectively.

29. The multilayer ceramic capacitor of claim 26, wherein the first and second internal electrodes are connected to the fifth and sixth surfaces of the body, respectively, and
the first and second external electrodes are disposed on the fifth and sixth surfaces of the body to contact the first and second internal electrodes, respectively.

30. The multilayer ceramic capacitor of claim 26, further comprising a third external electrode,
wherein the first internal electrodes are connected to the third surface or the fourth surface of the body,
the second internal electrodes are disposed to be connected to the fifth and sixth surfaces of the body,
the first external electrode is disposed on the third surface of the body,
the second external electrode is disposed on the fourth surface of the body, and
the third external electrode is connected to the second internal electrodes and is disposed on the first, second, fifth, and sixth surfaces of the body.

31. The multilayer ceramic capacitor of claim 30, further comprising a third internal electrode,
- wherein the first internal electrodes are connected to the third surface of the body and is disposed to contact the first external electrode, and
- the third internal electrode is connected to the fourth surface of the body and is disposed to contact the second external electrode.

32. The multilayer ceramic capacitor of claim 26, further comprising a third external electrode,
- wherein the first internal electrodes are connected to the third and fourth surfaces of the body,
- the second internal electrodes are disposed to be connected to the fifth and sixth surfaces of the body,
- the first and second external electrodes are disposed on the third and fourth surfaces of the body, respectively, and are connected to the first internal electrodes, and
- the third external electrode is connected to the second internal electrodes, and is disposed on the first, second, fifth, and sixth surfaces of the body.

33. The multilayer ceramic capacitor of claim 26, wherein when a margin of the first internal electrodes in a width direction is d, and a margin of the second internal electrodes in a width direction is c, a ratio (c/d) is 0.33 or more (where, c>0 and d>0).

34. A multilayer ceramic capacitor, comprising:
- a body including a dielectric layer and a plurality of first and second internal electrodes having different sizes to each other, and having first and second surfaces opposing each other in a stacking direction, third and fourth surfaces connected to the first and second surfaces and opposing each other, and fifth and sixth surfaces connected to the first and second surfaces and connected to the third and fourth surfaces, and opposing each other; and
- first, second, and third external electrodes,
- wherein when respective margins of the plurality of first internal electrodes in a width direction are d, and respective, corresponding margins of the plurality of second internal electrodes in a width direction are c, a ratio (c/d) is less than 1 and 0.33 or more (where, c>0 and d>0),
- the first internal electrodes are connected to the third surface or the fourth surface of the body,
- the second internal electrodes are disposed to be connected to the fifth and sixth surfaces of the body,
- the first external electrode is disposed on the third surface of the body,
- the second external electrode is disposed on the fourth surface of the body, and
- the third external electrode is connected to the second internal electrodes and is disposed on the first, second, fifth, and sixth surfaces of the body.

35. The multilayer ceramic capacitor of claim 34, wherein the ratio (c/d) is 0.67 or less.

36. The multilayer ceramic capacitor of claim 34, wherein a difference (d−c) between the margin (d) and the margin (c) is 10 µm or more.

37. The multilayer ceramic capacitor of claim 26 or claim 32, wherein an average thickness of the first and second internal electrodes is 0.4 µm or less.

38. The multilayer ceramic capacitor of claim 34, wherein when a margin of the first internal electrodes in a longitudinal direction is b, and a margin of the second internal electrodes in a longitudinal direction is a, a ratio (a/b) is 0.33 or more (where, a>0 and b>0).

* * * * *